Patented Apr. 7, 1942

2,278,558

UNITED STATES PATENT OFFICE 2,278,558

TREATMENT OF RUBBER

Philip T. Paul, Naugatuck, Conn., assignor to United States Rubber Company, New York, N. Y., a corporation of New Jersey No Drawing. Application March 16, 1939, Serial No. 262,108

8 Claims. (Cl. 260—808)

This invention relates to the treatment of rubber and similar oxidizable materials and more particularly to a new class of deterioration retarders.

This application is a continuation-in-part of my copending application Serial No. 164,527, filed September 18, 1937.

An object of this invention is to provide a new class of anti-oxidants or age resistors for organic substances which tend to deteriorate by absorption of oxygen from the air, for example goods of rubber or allied gums, unsaturated fatty oils, petroleum oils such as gasolines, soaps, aldehydes, synthetic resins, turpentine and the like. A further object of the invention is to provide chemicals which additionally act as flex-improvers or anti-flex cracking agents for vulcanized rubber, such as tire treads, which undergo repeated strains during use. By this invention chemicals are provided which also act as excellent preservatives for rubber against deterioration caused by heat and light. Further objects will be apparent from the following description.

According to the invention rubber and the like as aforesaid is treated with a diaryl amino compound having at least one of the hydrogens of at least one of the aryl rings substituted by an alkenyl-oxy group. Examples of such substances are:

2-allyloxy diphenylamine
3-allyloxy diphenylamine
4-ethyl 4'-allyloxy diphenylamine
4-nitro 4'-allyloxy diphenylamine
4-chlor 4'-allyloxy diphenylamine
2,4-diamino 4'-allyloxy diphenylamine
4-phenylamino 4'-allyloxy diphenylamine
4-isopropenyl 4'-allyloxy diphenylamine
Diallyloxy dinaphthylamine
3-allyloxy 5,5-dimethyl acridan
4-mercapto 4'-allyloxy diphenylamine
4-(methyl mercapto) 4'-allyloxy diphenylamine
4-allyloxy phenyl alpha or beta naphthyl nitrosamine
4,4'-diallyloxy diphenylamine
2,4-dimethyl 4'-allyloxy diphenylamine
4-vinyloxy diphenylamine
4-allyloxy thio diphenylamine
4-dimethylamino 4'-cinnamyloxy diphenylamine (cis and trans)
4-diphenylamino 4'-allyloxy diphenylamine
4-(4-allyloxy anilino) 4'-allyloxy diphenylamine
4-(methyl phenyl amino) 2-allyloxy diphenylamine
2-(allyloxy phenyl amino) naphthalene
1-(cinnamyloxy phenyl amino) naphthalene
4-allyloxy diphenyl nitrosamine
4-allyloxy diphenyl hydrazine (unsymmetrical)
4-allyloxy diphenylamine
2-methallyloxy diphenylamine
3-methallyloxy diphenylamine
2-methallyloxy diphenylamine
4,4'-dimethallyloxy diphenylamine
4-crotyloxy diphenylamine
4-isocrotyloxy diphenylamine
4-methyl vinyl carbinyloxy diphenylamine
4-(b-ethoxy) vinyloxy diphenylamine
4-allyloxy phenyl beta naphthylamine
2-allyloxy phenyl beta naphthylamine
4-methallyloxy phenyl alpha naphthylamine
4-methyl 4'-allyloxy diphenylamine
4-methyl 4'-methallyloxy diphenylamine
4-dimethylamino 4'-allyloxy diphenylamine
4-methyl phenylamino 4'-methallyloxy diphenylamine
4-allyloxy 4'-(methyl phenyl amino) diphenylamine
4-gamma chloroallyloxy diphenylamine
4-vinyloxy 4'-phenyl diphenylamine
4-cinnamyloxy diphenylamine
4-phenoxy 4'-allyloxy diphenylamine
4-anilino 4'-methallyloxy diphenylamine
4-anilino 4'-allyloxy diphenylamine
4-phenyl 4'-allyloxy diphenylamine The substituted diarylamines for the purposes of the present invention, subscribe to the general formula:

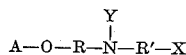

where R and R' are each an aryl radical singly bonded to O and N, and N and X, respectively. They are preferably further unsubstituted, but may contain as further substituents in the aryl nucleus such as the following groups: amino, halogen, secondary or tertiary alkyl amino, secondary or tertiary arylamino, mercapto, alkyl mercapto, etc. Y is hydrogen, nitroso (N=O), or amino (NH$_2$); O is oxygen; N is nitrogen; A is an alkenyl group; X is hydrogen or an alkenyloxy group. In either or both A and X the alkenyl group may be further substituted with maintenance of the unsaturated bond as by any of the following groups: Halogen, amino, hydroxyl, secondary or tertiary alkyl amino, secondary or tertiary aryl amino, mercapto, alkyl mercapto, alkoxy, aryloxy.

The preferred substituted diarylamines for the purposes of the present invention, subscribe to the general formula

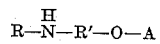

where R is an aryl radical of the benzene, naphthalene or diphenyl series singly bonded to N; R' is an arylene radical singly bonded to N and O respectively; and A is an alkenyl radical singly bonded to the oxygen, having the general formula

or in the case of an alkenyl group bearing a substituent having the general formula:

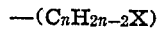

O is oxygen; N is nitrogen; H is hydrogen; C is carbon; X represents halogen, or hydroxy, alkoxy, anilino, amino, aryl, tertiary amino, etc. group. The aryl radicals, R and R' may also contain substituents such as halogen, hydroxy, aryloxy, alkyl, amino, aryl, secondary alkylamino, tertiary alkyl amino, alkenyloxy, anilino, mercapto, alkyl mercapto, alkenyl, etc.

The materials have special and outstanding properties in connection with the preservation of rubber and vulcanized rubber goods, and of which the following examples constitute preferred embodiments in illustration of the invention but with no intention to restrict the invention thereto. The parts are by weight.

*Example 1.*—The preparation of 4-allyloxy diphenylamine:

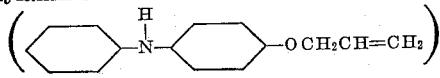

4-hydroxy diphenylamine (92.5 grams) are dissolved in a mixture of 40 cc. 36% sodium hydroxide and 60 cc. alcohol and the solution heated to boiling. With stirring and heating a solution of 42 cc. allyl chloride in 40 cc. alcohol are run in over a period of 45 minutes. Toward the end of the addition of the allyl chloride, the color lightens from a brown to a yellow. After all the allyl chloride has been added, the mixture is refluxed for half an hour and then drowned in water. The allyloxy diphenylamine is extracted with benzene or ether and the extract washed several times with dilute sodium hydroxide, and then with water. After drying, the solvent is evaporated and the residue, on standing, crystallizes. It is purified by recrystallizing from ligroin or alcohol.

*Analysis*

Melting point _____ ° C__ 46–47
Nitrogen:
    Theory _____ per cent__ 6.23
    Found _____ do____ 6.12

*Example 2.*—Preparation of di-allyloxy diphenylamine:

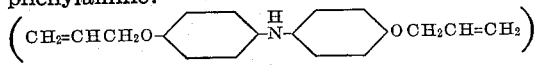

4,4'-dihydroxy diphenylamine in a 50% alcohol solution is treated with a slight excess of allyl bromide and sodium hydroxide. After the exothermic reaction has subsided the mixture is heated for an hour on the water bath. The di-allyloxy diphenylamine is separated by extraction with benzene and purified by vacuum distillation.

*Example 3.*—Preparation of a cis-trans mixture of 4-cinnamyloxy diphenylamine:

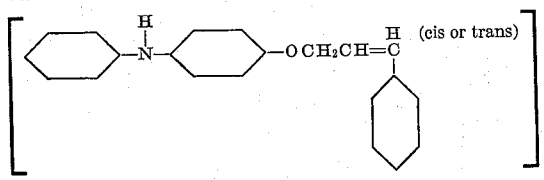

4-hydroxy diphenylamine is treated with a slight excess of cinnamyl chloride and sodium hydroxide by refluxing a 50% aqueous alcoholic solution of the three reactants. The 4-cinnamyl oxy diphenylamine is separated by pouring into water and extracting with benzene. After washing several times with warm dilute alkali and then with water, the benzene solution is evaporated, leaving an oil which consists substantially of the cis and trans form of 4-cinnamyloxy diphenylamine.

*Example 4.*—Preparation of 4-methallyloxy diphenylamine:

4-hydroxy diphenylamine (92.5 grams) was dissolved in a mixture of 40 cc. of 36% sodium hydroxide and 50 cc. alcohol, and the solution heated to reflux. With stirring and heating 60 cc. methallyl chloride was added in about 15 to 20 minutes. After the addition of the halide had been completed, refluxing was continued for 45 minutes, and then the reaction mixture was poured into 1,000 cc. cold water. An oil separated which soon solidified. After washing twice with water, the crude product was purified by recrystallizing from alcohol, from which it separates in the form of pure white crystals melting at 72–73° C.

*Analysis*

Nitrogen:
                                      Per cent
    Theory _____ 5.84
    Found _____ 5.72

*Example 5.*—Preparation of gamma chloro allyloxy diphenylamine (cis trans mixture):

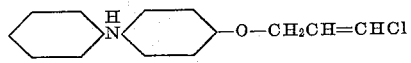

4-hydroxy diphenylamine (36.3 grams) was dissolved in a mixture of 16.8 cc. 35% sodium hydroxide and 50 cc. alcohol and the solution heated to reflux. A small amount of sodium hydrosulfite was added to reduce discoloration. With stirring and heating, 18.1 cc. dichloro propene was added over a period of two hours. Refluxing was continued for four hours after all the halide had been added. The reaction mixture was then poured into ice water, extracted with ether and the ether extract washed with dilute alkali and then with water until neutral. After evaporation of the ether, the residual oil was subjected to a steam distillation to remove any unchanged 1,3-dichlor propene and any 1-chloro propene-1-ol-3 formed by the hydrolysis of 1,3-dichloro propene. The oil was separated from the water and dried at 110° in vacuo. It has the following chemical and physical properties.

*Analysis*

Nitrogen:
    Theory _____ per cent__ 5.40
    Found _____ do____ 5.94
Chlorine:
    Theory _____ do____ 13.68
    Found _____ do____ 12.42
Specific gravity _____ 1.210
Index of refraction _____ 1.58 to 1.60

*Example 6.*—Preparation of a mixture of methyl vinyl carbinyloxy diphenylamine

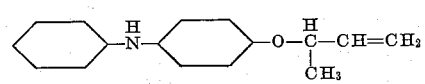

and crotyloxy diphenylamine

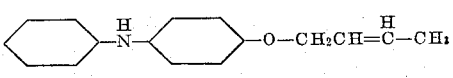

(cis-trans):

The preparation of this material was carried out as described for the preparation of gamma chloro allyloxy diphenylamine. 4-hydroxy diphenylamine (46 grams) was dissolved in a mixture of 22 cc. 35% sodium hydroxide and 50 cc. alcohol and treated with 22.5 grams of a mixture of methyl vinyl carbinyl chloride and crotyl chloride. The product, after treatment with steam, was dried in vacuo at 110° C. It amounted to 26.1 grams, and had the following physical and chemical properties.

*Analysis*

Nitrogen:
  Theory _____ per cent__ 5.84
  Found_____ do____ 5.92
Index of refraction_____ 1.627
Specific gravity_____ 1.110

The effectiveness of chemicals of this class for retarding oxidation of rubber is illustrated by the results of standard accelerated aging and flexing tests on commercial rubber compounds. For example, tests were made on the following tread compounds, the parts being by weight:

*Mix master batch*

| | |
|---|---|
| Smoked sheets | 100. |
| Carbon black | 45. |
| Zinc oxide | 5. |
| Pine tar | 3.50 |
| Zinc soap of cocoanut oil fatty acids | 3.50 |
| Sulfur | 3.00 |
| Mercaptobenzothiazole | 1.00 |
| | 161.00 |

To separate portions of this master batch 4-cinnamyloxy diphenylamine, 4-allyloxy diphenylamine, 4-methallyloxy diphenylamine, 4-(gamma chloro) allyloxy diphenylamine, and a mixture of 4-crotyloxy diphenylamine and 4-methyl vinyl carbinyloxy diphenylamine (cis-trans) are added in the proportion of 1.0 part to 100 parts of rubber, the percent remaining tensile on the resultant mixtures before and after aging 96 hours under 300 pounds oxygen at 70° C. are as follows:

| | Control | 4-cinnamyloxy diphenylamine |
|---|---|---|
| Unaged | 100 | 100 |
| Aged | 21 | 52 |

| | Control | 4-allyloxy diphenylamine |
|---|---|---|
| Unaged | 100 | 100 |
| Aged | 31 | 60 |

| | Control | 4-methallyloxy diphenylamine |
|---|---|---|
| Unaged | 100 | 100 |
| Aged | 29 | 59 |

| | Control | 4-(gamma chloro) allyloxy diphenylamine |
|---|---|---|
| Unaged | 100 | 100 |
| Aged | 28 | 66 |

| | Control | Mixture of 4-crotyloxy diphenylamine and 4-methyl vinyl carbinyloxy diphenylamine (cis-trans). |
|---|---|---|
| Unaged | 100 | 100 |
| Aged | 28 | 66 |

The invention may be applied to the preservation of natural as well as artificially-prepared rubber compositions, cured or uncured, including reclaims and latices of such compositions.

It is also to be understood that other desired filling and compounding ingredients may be incorporated along with the preservative, for example, in the case of rubber, there may be incorporated other accelerators, softeners, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the anti-oxidant may vary from about 0.1% to 5%, although either smaller or greater proportions may be found useful. If the material to which it is added is a liquid such as rubber cement or an oil the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surfaces of vulcanized or unvulcanized rubber goods.

Having thus described my invention, what I claim and desire to protect by Letters Patent is:

1. Method of preserving organic substances which tend to deteriorate by absorption of oxygen from the air which comprises incorporating therein a methallyloxy diarylamine.

2. Method of preserving oganic substances which tend to deteriorate by absorption of oxygen from the air which comprises incorporating therein methallyloxy diphenylamine.

3. A method of preserving rubber which comprises incorporating therein a methallyloxy diarylamine.

4. A method of preserving rubber which comprises incorporating therein a 4-methallyloxy diphenylamine.

5. A method of preserving organic substances which tend to deteriorate by absorption of oxygen from the air which comprises incorporating therein a compound having the formula

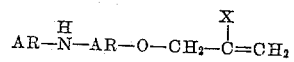

where AR represents an aromatic nucleus attached to the nitrogen directly through a nuclear carbon atom and X is an alkyl radical.

6. A rubber product containing a 4-methallyloxy diphenylamine.

7. The vulcanization product of a vulcanizable rubber composition containing a methallyloxy diarylamine.

8. The vulcanization product of a vulcanizable rubber composition containing methallyloxy diarylamine.

PHILIP T. PAUL.